(12) United States Patent
Brandstetter et al.

(10) Patent No.: US 11,126,338 B2
(45) Date of Patent: *Sep. 21, 2021

(54) COMPUTER-IMPLEMENTED SYSTEMS AND METHODS FOR PROVIDING CONSISTENT APPLICATION GENERATION

(71) Applicant: IPAR, LLC, San Francisco, CA (US)

(72) Inventors: Jeffrey D. Brandstetter, San Francisco, CA (US); Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/672,657

(22) Filed: Nov. 4, 2019

(65) Prior Publication Data

US 2020/0064990 A1    Feb. 27, 2020

Related U.S. Application Data

(63) Continuation of application No. 15/614,808, filed on Jun. 6, 2017, now Pat. No. 10,489,034, which is a
(Continued)

(51) Int. Cl.
*G06F 16/957* (2019.01)
*G06F 3/0484* (2013.01)
(Continued)

(52) U.S. Cl.
CPC ...... *G06F 3/04845* (2013.01); *G06F 3/04842* (2013.01); *G06F 3/04847* (2013.01);
(Continued)

(58) Field of Classification Search
USPC ........................................................ 717/109
See application file for complete search history.

(56) References Cited

U.S. PATENT DOCUMENTS 5,664,133 A    9/1997    Malamud et al.
5,737,527 A    4/1998    Shiels et al.
(Continued)

FOREIGN PATENT DOCUMENTS

WO    2008094616 A1    8/2008

OTHER PUBLICATIONS

Mystrands, Inc.; Mystrands Discovery for Windows; www.mystrands.com; 2006.
(Continued)

*Primary Examiner* — John Q Chavis
(74) *Attorney, Agent, or Firm* — Jones Day

(57) ABSTRACT

Systems and methods are provided for generating a plurality of applications of disparate types. A graphical user interface is provided for designing an interactive user experience, where a designed user experience includes an arrangement of experience elements, where the experience elements include a plurality interactive elements and decorative elements, and where each of the experience elements are configured for display according to one or more attributes. An identification of the experience elements and the attributes of the experience elements is received via the graphical user interface. An identification of a plurality of disparate types of applications to be generated based on the designed experience is received. The experience is translated for each of the disparate types of applications to generate the plurality of applications of disparate types.

20 Claims, 15 Drawing Sheets

Related U.S. Application Data continuation of application No. 14/847,476, filed on Sep. 8, 2015, now Pat. No. 9,684,438, which is a continuation of application No. 13/693,198, filed on Dec. 4, 2012, now Pat. No. 9,134,969.

(60) Provisional application No. 61/570,057, filed on Dec. 13, 2011.

(51) Int. Cl.
    *G06F 8/34* (2018.01)
    *G06F 16/958* (2019.01)
    *G06F 8/36* (2018.01)
    *H04L 29/08* (2006.01)

(52) U.S. Cl.
    CPC .............. *G06F 8/34* (2013.01); *G06F 8/36* (2013.01); *G06F 16/9577* (2019.01); *G06F 16/986* (2019.01); *H04L 67/02* (2013.01)

(56) References Cited

U.S. PATENT DOCUMENTS

| | | | |
|---|---|---|---|
| 5,802,361 | A | 9/1998 | Wang et al. |
| 6,233,731 | B1 | 5/2001 | Bond et al. |
| 7,136,853 | B1 | 11/2006 | Kohda et al. |
| 7,185,116 | B2 | 2/2007 | Apfel et al. |
| 7,464,058 | B2 | 12/2008 | Yen et al. |
| 7,806,329 | B2 | 10/2010 | Dmitriev et al. |
| 7,975,255 | B2 | 7/2011 | Kosov et al. |
| 8,091,036 | B1 | 1/2012 | Pavek et al. |
| 8,171,470 | B2 | 5/2012 | Goldman et al. |
| 8,489,984 | B1 | 7/2013 | Violet et al. |
| 8,689,234 | B2 | 4/2014 | Macken |
| 9,134,969 | B2 * | 9/2015 | Brandstetter ....... G06F 16/9577 |
| 9,684,438 | B2 * | 6/2017 | Brandstetter ........... H04L 67/02 |
| 10,489,034 | B2 * | 11/2019 | Brandstetter ....... G06F 3/04842 |
| 2002/0063734 | A1 | 5/2002 | Khalfay et al. |
| 2002/0120501 | A1 | 8/2002 | Bell et al. |
| 2002/0184314 | A1 | 12/2002 | Riise |
| 2004/0128358 | A1 | 7/2004 | Apfel et al. |
| 2005/0131762 | A1 | 6/2005 | Bharat et al. |
| 2006/0020596 | A1 | 1/2006 | Liu et al. |
| 2006/0235723 | A1 | 10/2006 | Millard |
| 2006/0278064 | A1 | 12/2006 | Lourdeaux |
| 2007/0044086 | A1 | 2/2007 | Sampath |
| 2007/0073596 | A1 | 3/2007 | Alexander et al. |
| 2007/0106551 | A1 | 5/2007 | McGucken |
| 2007/0156594 | A1 | 7/2007 | McGucken |
| 2007/0169165 | A1 | 7/2007 | Crull et al. |
| 2007/0204308 | A1 | 8/2007 | Nicholas et al. |
| 2007/0214179 | A1 | 9/2007 | Hoang |
| 2007/0288308 | A1 | 12/2007 | Chen et al. |
| 2008/0034329 | A1 | 2/2008 | Posner et al. |
| 2008/0040475 | A1 | 2/2008 | Bosworth et al. |
| 2008/0066099 | A1 | 3/2008 | Brodersen et al. |
| 2008/0071688 | A1 | 3/2008 | Corbett et al. |
| 2008/0090513 | A1 | 4/2008 | Collins et al. |
| 2008/0114750 | A1 | 5/2008 | Saxena et al. |
| 2008/0134018 | A1 | 6/2008 | Kembel et al. |
| 2008/0148245 | A1 | 6/2008 | Gutz |
| 2008/0201225 | A1 | 8/2008 | Maharajh et al. |
| 2008/0235216 | A1 | 9/2008 | Ruttenberg |
| 2009/0037355 | A1 | 2/2009 | Brave et al. |
| 2009/0197681 | A1 | 8/2009 | Krishnamoorthy et al. |
| 2009/0199227 | A1 | 8/2009 | Kennedy |
| 2009/0217036 | A1 | 8/2009 | Irwin et al. |
| 2009/0240586 | A1 | 9/2009 | Ramer et al. |
| 2010/0058485 | A1 | 3/2010 | Gonzalez |
| 2010/0086283 | A1 | 4/2010 | Ramachandran et al. |
| 2010/0094878 | A1 | 4/2010 | Soroca et al. |
| 2010/0180308 | A1 | 7/2010 | Howcroft et al. |
| 2010/0205628 | A1 | 8/2010 | Davis et al. |
| 2010/0235425 | A1 | 9/2010 | Holden et al. |
| 2010/0263005 | A1 | 10/2010 | White |
| 2010/0306283 | A1 | 12/2010 | Johnson et al. |
| 2011/0145719 | A1 | 6/2011 | Chen et al. |
| 2011/0179045 | A1 | 7/2011 | Caldwell et al. |
| 2011/0219394 | A1 | 9/2011 | Lueth et al. |
| 2011/0246574 | A1 | 10/2011 | Lento et al. |
| 2011/0265113 | A1 | 10/2011 | Apfel et al. |
| 2011/0271216 | A1 | 11/2011 | Wilson |
| 2011/0289084 | A1 | 11/2011 | Fisher |
| 2012/0089996 | A1 | 4/2012 | Ramer et al. |
| 2012/0102095 | A1 | 4/2012 | Campbell et al. |
| 2012/0131171 | A1 | 5/2012 | Samuel et al. |
| 2012/0136812 | A1 | 5/2012 | Brdiczka |
| 2012/0198364 | A1 | 8/2012 | Bomheimer et al. |
| 2012/0216122 | A1 | 8/2012 | Wong et al. |
| 2012/0290399 | A1 | 11/2012 | England et al. |
| 2013/0124673 | A1 | 5/2013 | Hjelm et al. |
| 2014/0195582 | A1 | 7/2014 | Sherwood et al. |

OTHER PUBLICATIONS

Pereira, Fernando, Vetro, Anthony, Sikora, Thomas; Multimedia Retrieval and Delivery; Essential Metadata Challenges and Standards; Proceedings of the IEEE, 96(4); pp. 721-744; 2008.
International Search Report and Written Opinion of the International Searching Authority; PCT/US2011/022865; dated Apr. 2011.
Written Opinion of the International Searching Authority; PCT/US2011/022871; dated 2012.
Digital Video Broadcasting; Content Protection and Copy Management; pp. 1-103; 2005.
Muhlbauer, Adam, Safavi-Naini, Reihaneh, Salim, Farzad, Sheppard, Nicholas, Surminen, Martin; Location Constraints in Digital Rights Management; Computer Communications, Elsevier Science Publishers, 31(6); pp. 1173-1180; 2008.
Written Opinion of the International Searching Authority; PCT/US2011/022876; dated 2012.
Subramanya, S.R., Yi, Byung; Utility Model for On-Demand Digital Content; Computer, IEEE Service Center, vol. 38, 6(1); pp. 95-98; 2005.
International Search Report and Written Opinion of the International Searching Authority; PCT/US2011/022902; dated Apr. 2011.
PR Newswire; Press Release; Mar. 12, 2011.
Spears, Joseph; GMANE Article, Beginner Questions on Clustering & M/R; Jul. 15, 2010.
Spears, Joseph; GMANE Article, Recommending Items for Anonymous Users; Apr. 19, 2010.
International Search Report and Written Opinion of the International Searching Authority; PCT/US2012/047520; dated Dec. 2012.
International Search Report and Written Opinion of the International Searching Authority; PCT/US2011/022877; dated Oct. 2011.

\* cited by examiner

COMPUTER-IMPLEMENTED SYSTEMS AND METHODS FOR PROVIDING CONSISTENT APPLICATION GENERATION

CROSS REFERENCE TO RELATED APPLICATIONS

This application is a continuation of U.S. patent application Ser. No. 15/614,808, filed on Jun. 6, 2017, and entitled "Computer-Implemented Systems and Methods for Providing Consistent Application Generation," which is a continuation of U.S. patent application Ser. No. 14/847,476, filed on Sep. 8, 2015, and entitled "Computer-Implemented Systems and Methods for Providing Consistent Application Generation," which is a continuation of U.S. patent application Ser. No. 13/693,198, filed on Dec. 4, 2012, and entitled "Computer-Implemented Systems and Methods for Providing Consistent Application Generation," the entireties of which are herein incorporated by reference. This application claims priority to U.S. Provisional Patent Application No. 61/570,057, filed Dec. 13, 2011, and entitled "Computer-Implemented Systems and Methods for Providing Consistent Application Generation," the entirety of which is herein incorporated by reference.

TECHNICAL FIELD

This document relates generally to brand messaging and more particularly to maintenance of a consistent brand image across multiple disparate application platforms.

BACKGROUND

The recognition and perception of a brand is highly influenced by its visual presentation. A brand's visual identity is the overall look of its communications. Effective visual brand identity is achieved by the consistent use of particular visual elements to create distinction, such as specific fonts, colors, and graphic elements.

SUMMARY

In accordance with the teachings herein, systems and methods are provided for generating a plurality of applications of disparate types. A graphical user interface is provided for designing an interactive user experience, where a designed user experience includes an arrangement of experience elements, where the experience elements include a plurality interactive elements and decorative elements, and where each of the experience elements are configured for display according to one or more attributes. An identification of the experience elements and the attributes of the experience elements is received via the graphical user interface. An identification of a plurality of disparate types of applications to be generated based on the designed experience is received. The experience is translated for each of the disparate types of applications to generate the plurality of applications of disparate type.

As another example, a computer-implemented system for generating a plurality of applications of disparate types includes one or more data processors and a computer-readable medium encoded with instructions for commanding the one or more data processors to execute a method. In the method, a graphical user interface is provided for designing an interactive user experience, where a designed user experience includes an arrangement of experience elements, where the experience elements include a plurality interactive elements and decorative elements, and where each of the experience elements are configured for display according to one or more attributes. An identification of the experience elements and the attributes of the experience elements is received via the graphical user interface. An identification of a plurality of disparate types of applications to be generated based on the designed experience is received. The experience is translated for each of the disparate types of applications to generate the plurality of applications of disparate type.

As a further example, a computer-readable medium is encoded with instructions for commanding one or more data processors to execute a method for generating a plurality of applications of disparate types. In the method, a graphical user interface is provided for designing an interactive user experience, where a designed user experience includes an arrangement of experience elements, where the experience elements include a plurality interactive elements and decorative elements, and where each of the experience elements are configured for display according to one or more attributes. An identification of the experience elements and the attributes of the experience elements is received via the graphical user interface. An identification of a plurality of disparate types of applications to be generated based on the designed experience is received. The experience is translated for each of the disparate types of applications to generate the plurality of applications of disparate type.

BRIEF DESCRIPTION OF THE FIGURES

FIG. 6 depicts an iPAD platform application that has been modified to reflect the brand image changes.

FIG. 13 depicts an iPAD platform application utilizing a white label solution of a service provider.

DETAILED DESCRIPTION

Figure 1:
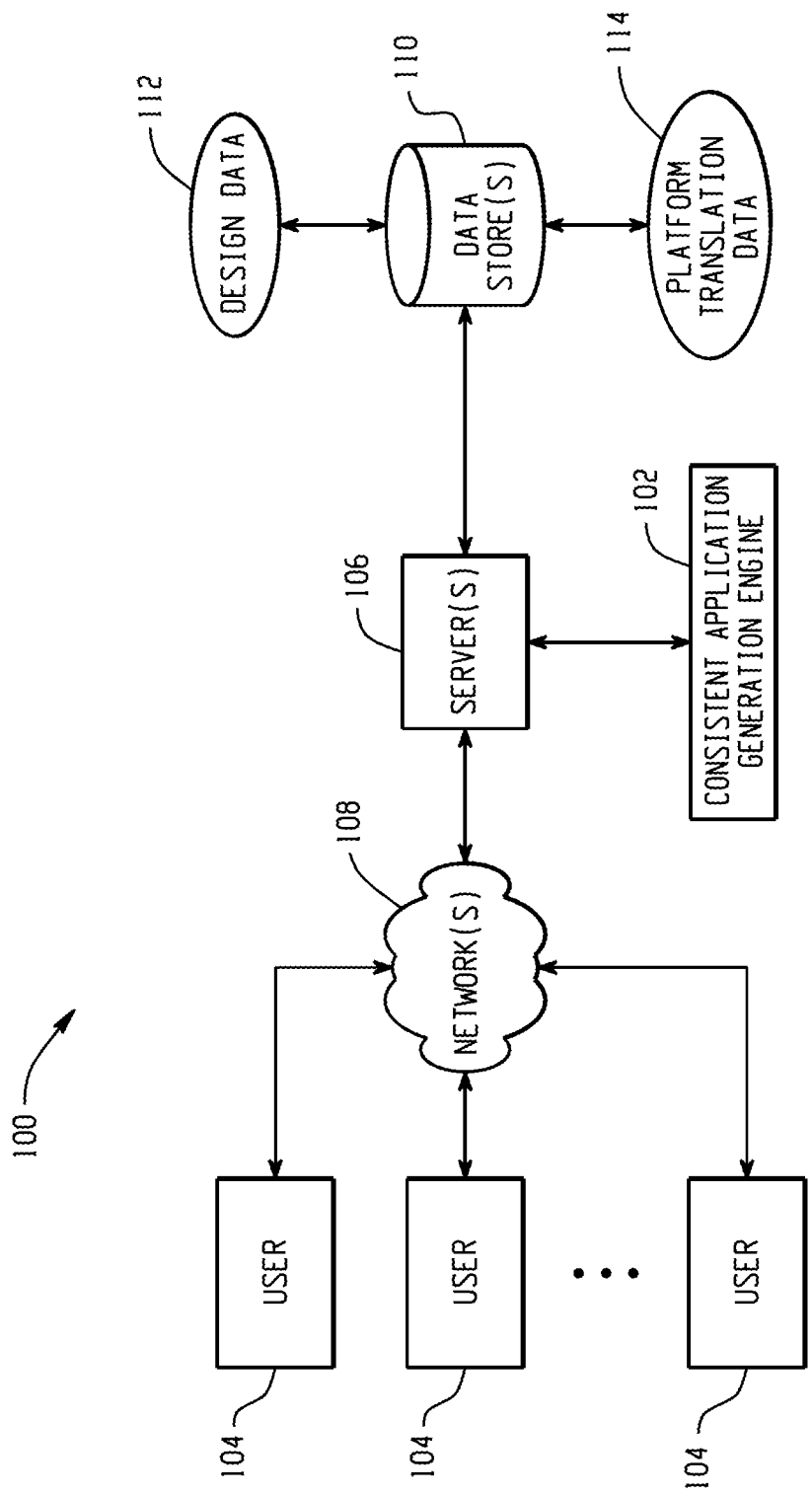
FIG. 1 is a block diagram depicting a computer-implemented consistent application generation engine.

FIG. 1 is a block diagram depicting a computer-implemented consistent application generation engine. The consistent application generation engine 102 provides functionality to one or more users 104 (e.g., application programmers, designing users) to generate multiple applications of different (disparate) types in an efficient manner, while maintaining a consistent brand image across the multiple applications. To maximize recognition and perception of a brand, the visual presentation of that brand should be consistent across all mediums in which a consumer encounters that brand. A lack of coherency in brand image across different brand experiences may cause significant confusion in the consumer base, such that consumers may lose confidence in the source of goods, services, and advertising. When consumers are unsure about sources of goods, services, and advertising, opportunities for building brand recognition, brand loyalty, and other goodwill may be severely diminished.

Maintaining a consistent brand image is considered a high value operation, where millions of dollars are spent annually in marketing departments throughout the world, reviewing outgoing products and advertisements, as well as the operations of related entities (e.g., the behaviors of franchisees) to ensure that the brand images are used consistently and appropriately in all settings. However, at times, strategic decisions may be made to alter, change, or completely rehash a brand image (e.g., the current brand image does not evoke the desired consumer feeling, an accident or scandal has tarnished the current brand image). When such a change is warranted, it is highly desirable to implement the change in a wholesale manner across all avenues with which consumers will encounter the brand image. Such a wholesale change, where all changes to the brand image are made at the same time across all mediums, is beneficial, as it minimizes brand confusion that will result from consumers encountering differing brand images (while some consumer confusion is likely in a switch-over, that confusion is prolonged during periods where multiple, conflicting brand images are provided to consumers).

The wholesale transition of brand image can provide technical challenges that can make such transitions difficult, highly expensive, or impossible to achieve simultaneously. For example, brand images need to be changed on all products that bear a brand image (packaging colors, patterns, logos) and advertising that includes the brand image at the same time. Thus, in some examples, changes need to be made simultaneously across multiple different pipelines (product packaging, television advertising, digital advertising, terrestrial mail advertising).

Such an issue is highly present in companies that make significant use of online portal applications. Online portal applications (e.g., webpages, iPHONE/iPAD applications, Android applications, ROKU applications, gaming system applications) provide interfaces for users to interact with online company content. Such content may be provided for a variety of purposes, such as for entertaining consumers (e.g., smart device games), providing tangible goods shopping experiences, and providing access to content (e.g., video download, streaming video, a physical video copy, an audio download, streaming audio, a physical audio copy, an image, a game, a physical book, or an electronic book). This content may be provided for free (e.g., to build brand loyalty, brand recognition) or may be provided for a fee (e.g., fees are paid to download audio or streaming video).

The fast pace of technological development makes each of the many available portal platforms a viable avenue for attracting consumers, where neglecting one of those platforms can result in significant lost revenues. Thus, many companies will want to offer a presence on each of several portal platforms. This requires multiple applications, one for each of the platforms, that require separate programming for compatibility with the different platforms, while maintaining a consistent brand image across the several different platform applications.

Figure 2:
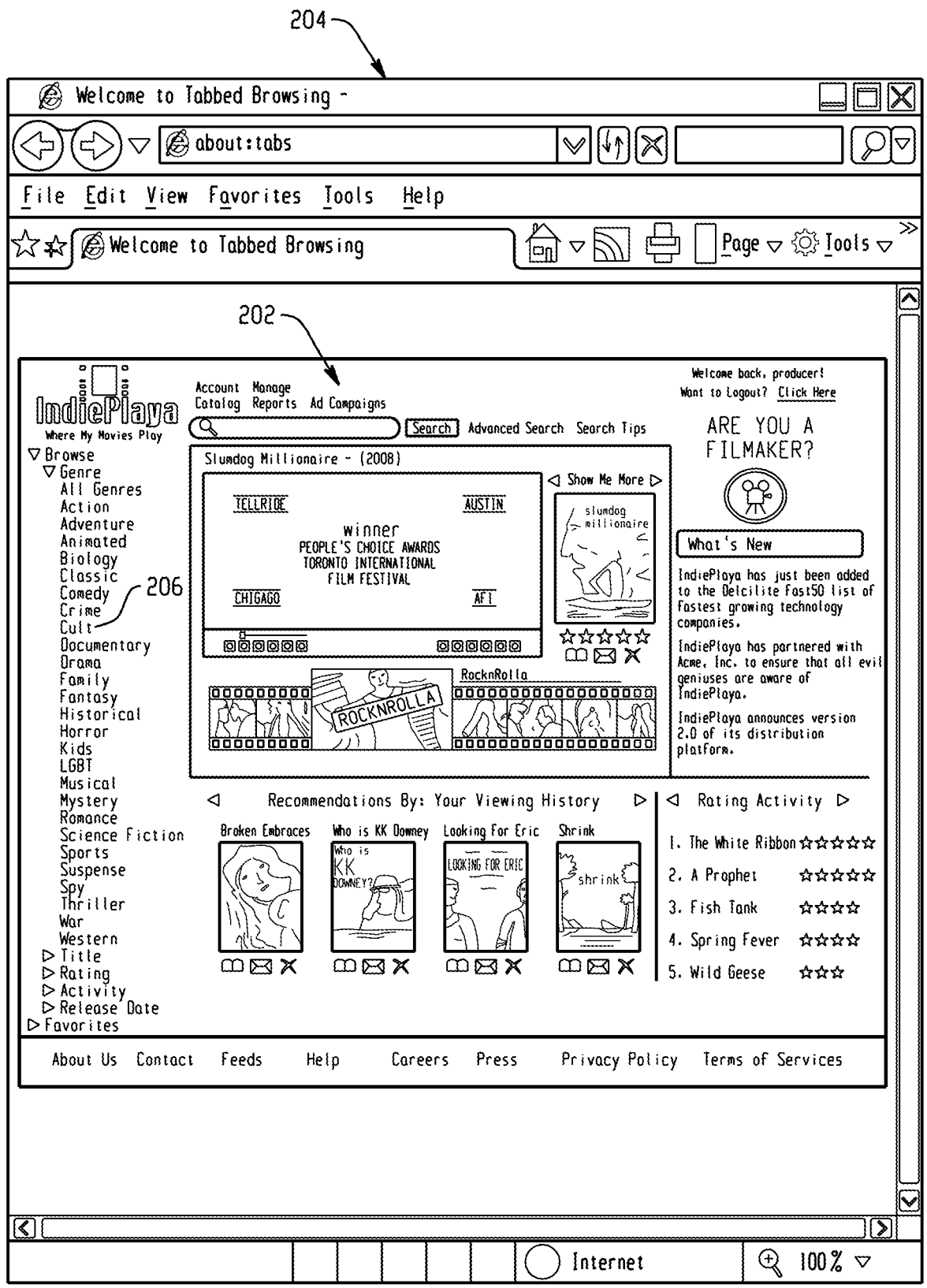
FIG. 2 depicts an online portal application in the form of a webpage in a web browser.

When a decision to make a brand image change is made, that change needs to be propagated to all of the different portal applications. For example, FIG. 2 depicts an online portal application in the form of a webpage 202 in a web browser 204. The online portal application 202 offers a platform for content creators to upload content for consumers to access (e.g., renting access to a video stream of a movie, buying a movie or book download). The online portal application includes a set of links 206 on the left hand side of the webpage that provide access to different genres of content.

Figure 3:
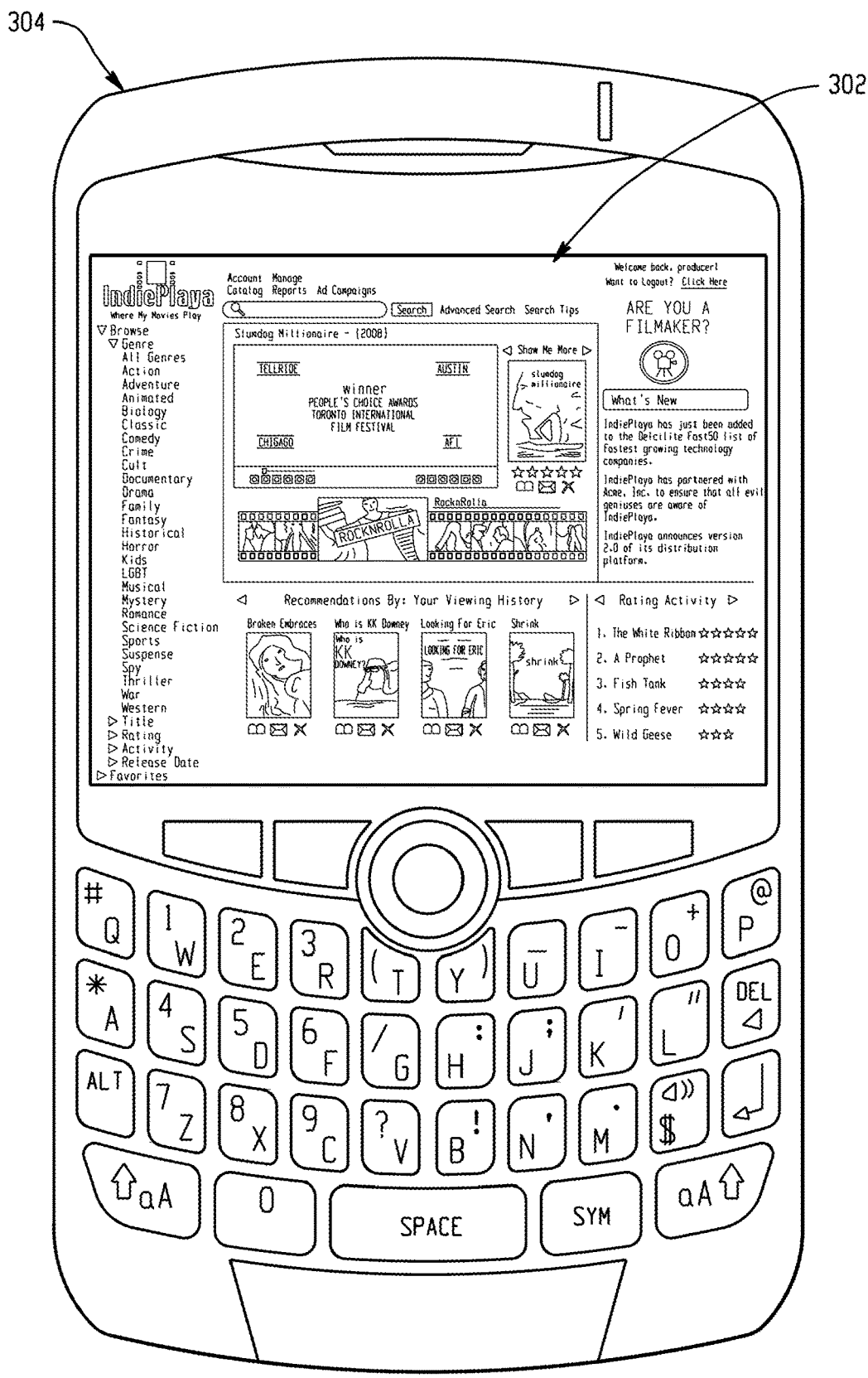
FIG. 3 depicts an online portal application in the form of a smart phone application.

As noted above, it is desirable to maintain a consistent brand image across different online portal applications provided for different platforms. FIG. 3 depicts an online portal application in the form of a smart phone application 302, such as a Blackberry application, operating on a smart phone 304. The smart phone application 302 has a consistent look and feel to the webpage portal application depicted at 202 in FIG. 2. However, the smart phone application 302 is designed specifically for the programming platform associated with the smart phone 304. Because the webpage portal application 202 and the smart phone application 302 are programmed for different platforms, they may require substantially differences in coding (e.g., syntax, permitted functions, required resources). Thus, programming for the two portal applications 202, 302 may require substantially separate efforts (e.g., programmed by different programmers having expertise in the different programming platforms).

Figure 4:
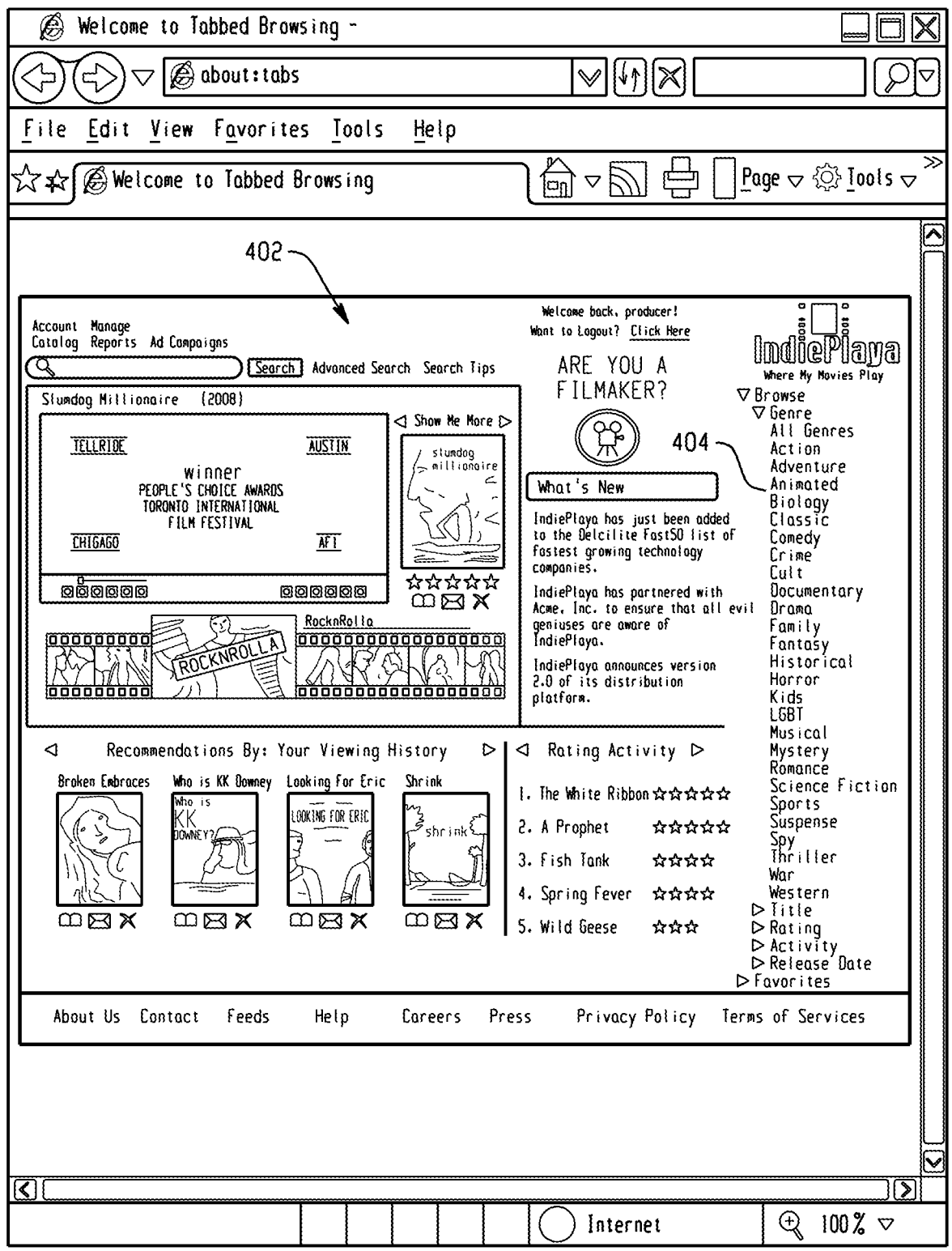
FIG. 4 depicts a minor example change in brand image, where a set of links is moved from the left side of a portal application to the right side of the application.
Figure 5:
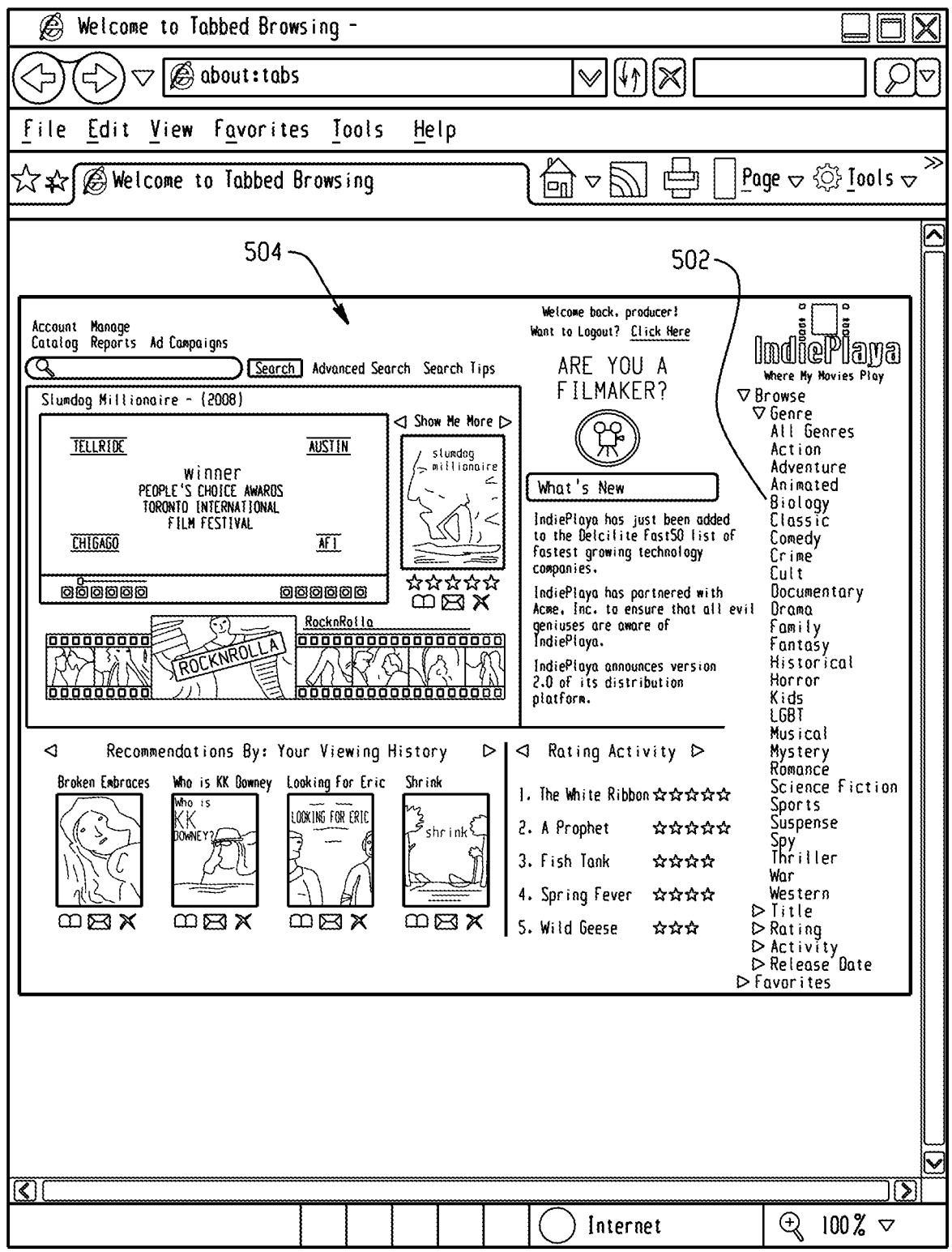
FIG. 5 depicts a more significant brand image change, where the positioning of the set of links is changed in addition to changing a background color associated with the webpage portal application.

As discussed above, a company may at times decide to modify its brand image. Modifications may be small (e.g., a change in hue of coloring on a product package) or more significant (e.g., using a completely new logo). FIG. 4 depicts a minor example change in brand image, where a webpage portal application 402 moves a set of links 404 from the left side of the application 402 (as shown in FIGS. 2 and 3) to the right side of the application. FIG. 5 depicts a more significant brand image change, where the positioning of the set of links 502 is changed in addition to changing a background color associated with the webpage portal application 504.

Figure 6:
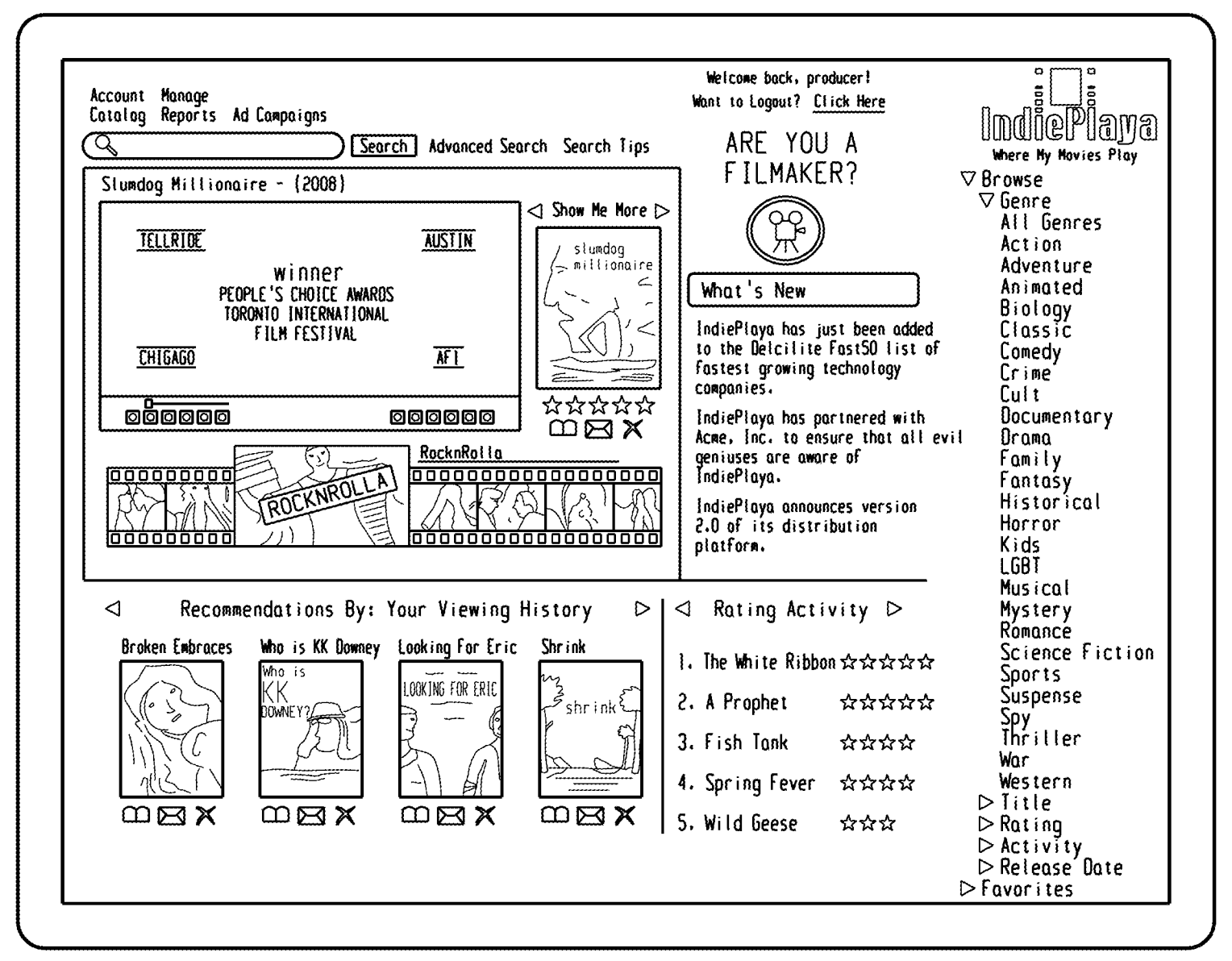

Having made the decision to implement the brand image changes noted in FIG. 5, those brand image changes need to be implemented in all avenues where the brand image will be encountered by consumers (e.g., the several application platforms), preferably simultaneously. For example, having made the brand image changes in the website portal application shown in FIG. 5, those changes must also be implemented for the other platform applications, as shown in FIG. 6, which shows an iPAD platform application that has been modified to reflect the brand image changes.

Figure 7:
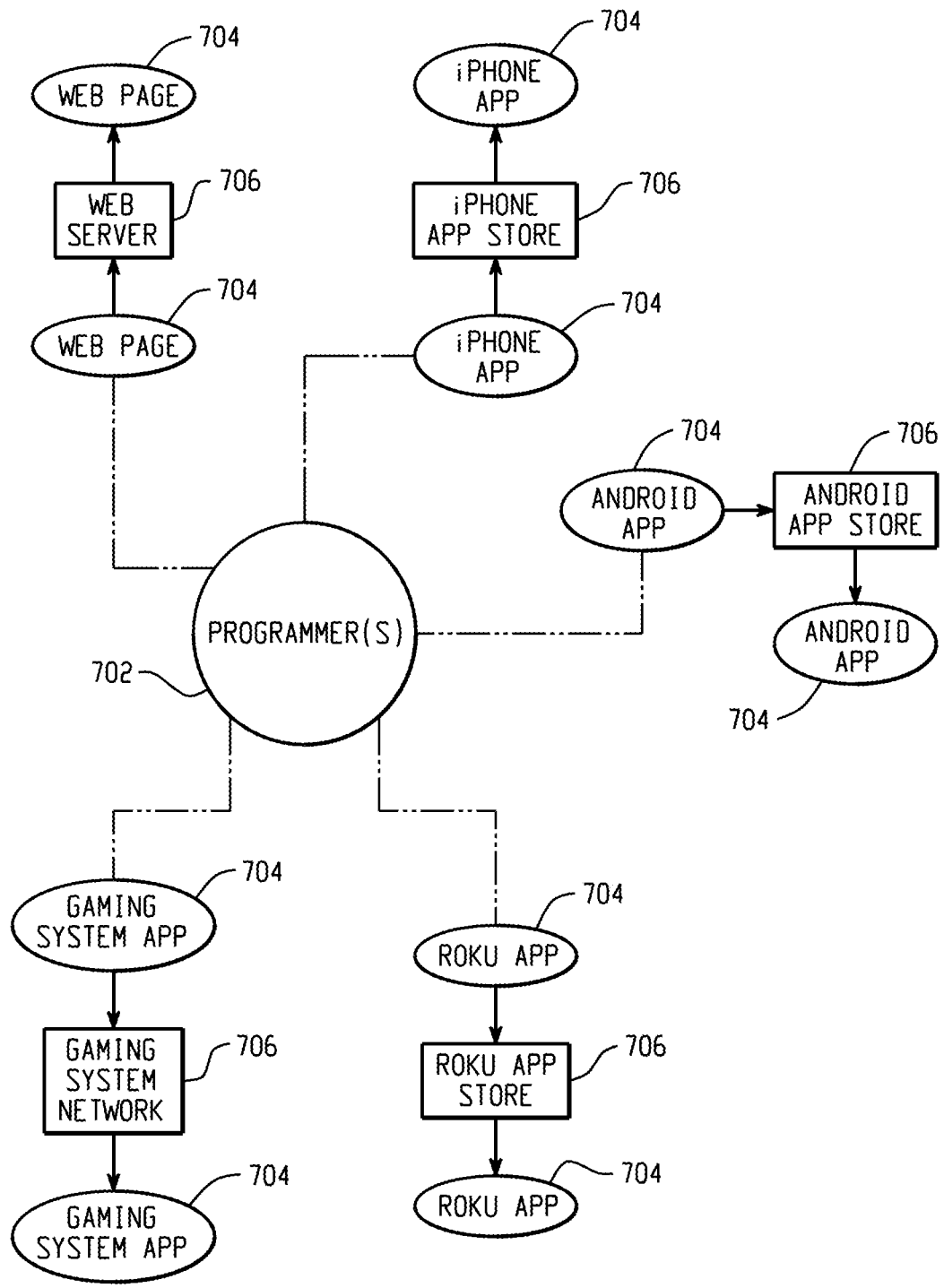
FIG. 7 is a block diagram depicting the different platform applications that a programmer must revise to implement brand image changes.

Propagating the brand image changes to the several platform applications can be expensive and time consuming. FIG. 7 is a block diagram depicting the different platform applications that a programmer must revise to implement brand image changes. When a brand image change is directed, one or more programmers 702 must implement the change in each of the several different platform applications 704 (e.g., a webpage, an iPHONE app, an Android app, a gaming system (e.g., Playstation, Wii, xBox) app, a ROKU app), and upload those applications to the respective platform application repository 706 (e.g., a web server, iPHONE app store, Android app store, gaming system app store, ROKU app store), where the platform applications 708 are made available for access or download by users. These programming and distribution operations can be highly work intensive and expensive, especially in cases where all of the brand image changes are to be implemented simultaneously.

With reference back to FIG. 1, the consistent application generation engine 102 provides a mechanism for users 104 to generate a plurality of applications of disparate types that can provide a consistent brand image across the plurality of applications. A user 104 accesses the consistent application generation engine 102, which is hosted via one or more servers 106, via one or more networks 108. The one or more servers 106 communicate with one or more data stores 110. The one or more data stores 110 may contain a variety of data that includes design data 112 and platform translation data 114.

Figure 8:
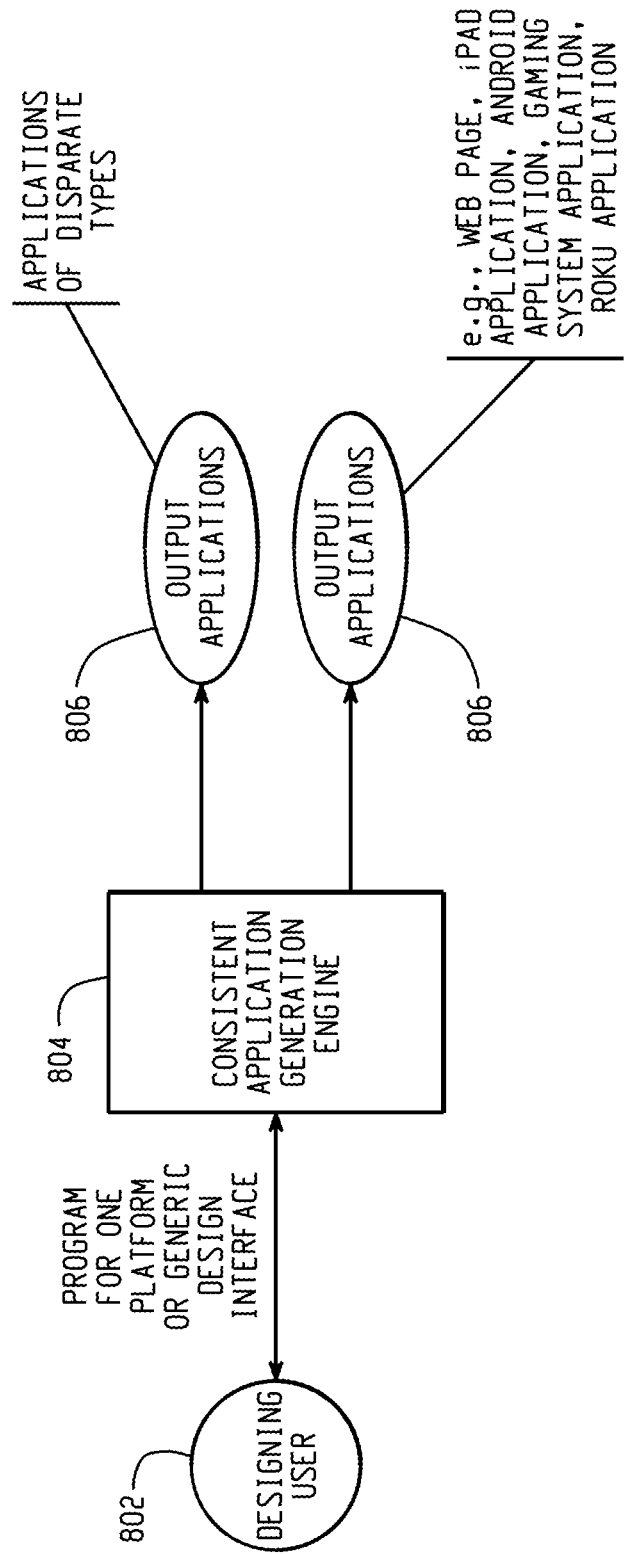
FIG. 8 is a block diagram depicting the generation of a plurality of applications of disparate types using a consistent application generation engine.

FIG. 8 is a block diagram depicting the generation of a plurality of applications of disparate types using a consistent application generation engine. A designing user 802 (e.g., a programmer, a non-technically trained user, a marketing professional) interacts with the consistent application generation engine 804 to generate the plurality of applications 806 designed for disparate application platform types. The designing user 802 designs an interactive user experience by creating a new platform application or modifying an existing platform application (e.g., revising a brand image reflected in existing platform applications). The designing user 802 may design the interactive user experience by using a user interface to program one instance of the user interface (e.g., programming a webpage platform application version) and instructing the consistent application generation engine 804 as to the platforms for which other output applications 806 should be generated. For example, the designing user 802 may specify that an iPAD application, an Android application, a gaming system application, and a ROKU application should be generated based on the webpage platform application designed by the designing user 802.

Alternatively, the designing user 802 may be provided with a user interface that displays a template of the interactive user experience for design. Following manipulation of the template, the consistent application generation engine 804 may translate the experience for each of the disparate types of applications 806 to be generated.

Figure 9:
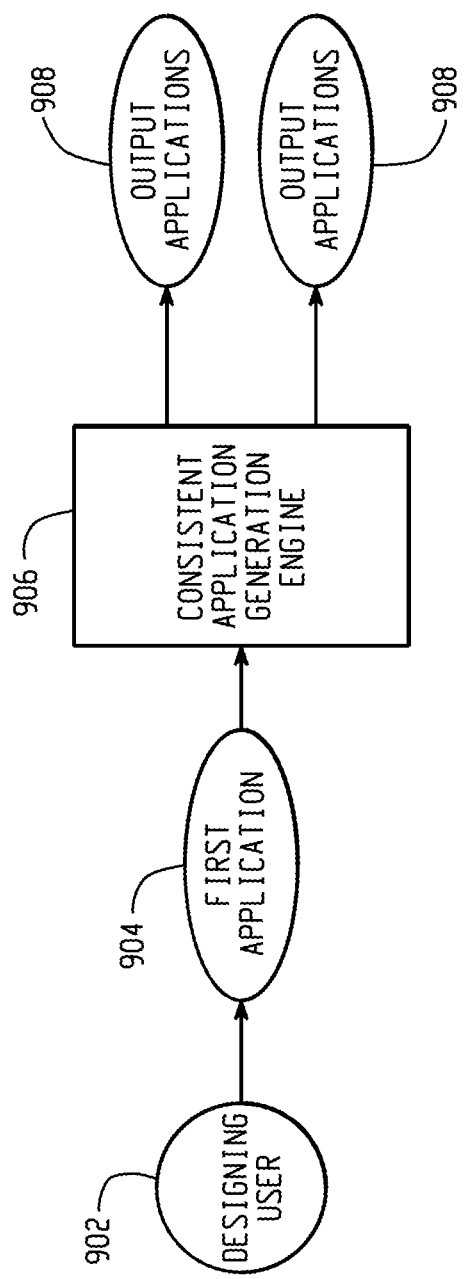
FIG. 9 is a block diagram depicting an alternative configuration for inputting a designed interactive user experience.

FIG. 9 is a block diagram depicting an alternative configuration for inputting a designed interactive user experience. In the example of FIG. 9, a designing user 902 designs an interactive user experience in the form of a first application 904 external to the consistent application generation engine 906. After receiving an identification of the plurality of disparate types of applications to generate, the consistent application generation engine 906 translates the experience embodied in the provided first application 904 for each of the disparate types of applications to generate the plurality of applications 908 of disparate types. For example, the designing user 902 may provide an iPHONE app that includes the designed interactive user experience. Upon instructions from the designing user 902, the consistent application generation engine 906 generates a Playstation app and a ROKU app as output applications 908.

Figure 10:
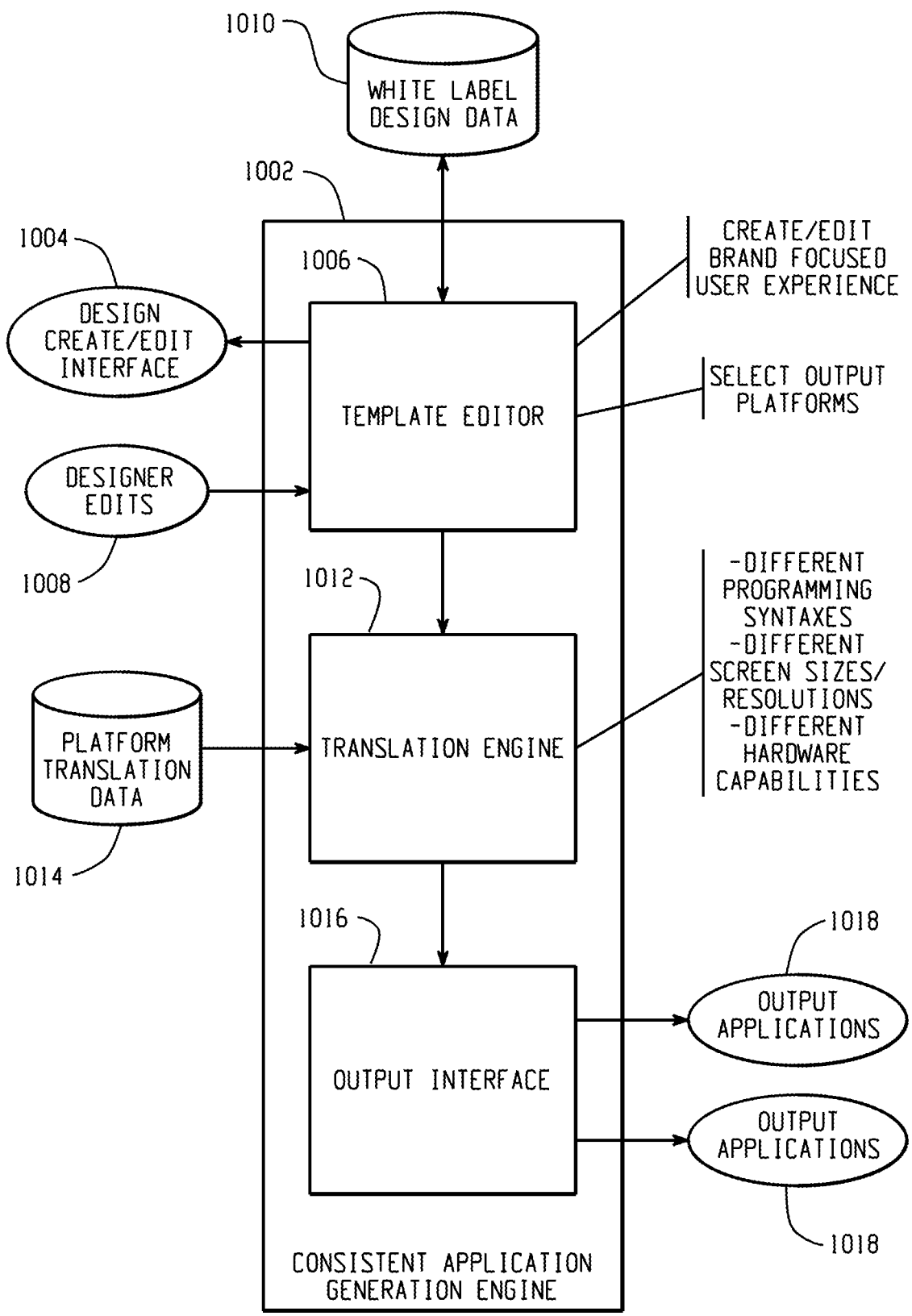
FIG. 10 is a block diagram depicting the generation of applications of disparate types by a consistent application generation engine.

FIG. 10 is a block diagram depicting the generation of applications of disparate types by a consistent application generation engine. A consistent application generation engine 1002 provides a graphical user interface 1004 for designing an interactive user experience via a template editor 1006. The designed user experience includes an arrangement of experience elements. The experience elements include decorative elements, such as images, background colors, and background images as well as interactive elements, such as links, audio, video, applets, controls, and buttons. The designing user provides designing user edits 1008 to the interactive user experience design. For example, the designing user edits 1008 may specify the experience elements that are to be included in the interactive user experience as well as attributes of those experience elements, where the experience elements will be displayed according to the attributes. Attributes can include such parameters as size, color, function, destination, data fields, as well as others.

The template editor 1006 enables creation and editing of brand focused user experiences. The template editor 1006 may direct that the designed interactive user experience that includes designing user edits 1008 be stored at 1010 for subsequent access, use, and updating. The template editor 1006 may also accept input regarding for which platforms applications should be translated.

When design of the interactive user experience is complete, a translation engine 1012 generates applications of disparate types, as directed by the designing user instructions. The translation engine 1012 may access platform translation data 1014 for parameters for performing the translations, such as appropriate syntaxes required for the different platforms, different screen sizes/resolutions supported by the different platforms, as well as other hardware supported by the different platforms (e.g., the translation engine 1012 may not include HD-quality images into a platform application where the associated platform does not support HD quality displays, saving on application size and bandwidth costs). An output interface 1016 receives and outputs the generated output applications for eventual access by users. In the example of FIG. 10, the output applications 1018 are provided to the designing user (and/or other parties), where the designing user can then provide the output applications 1018 to the appropriate repositories (e.g., web server, app store) for user access.

Figure 11:
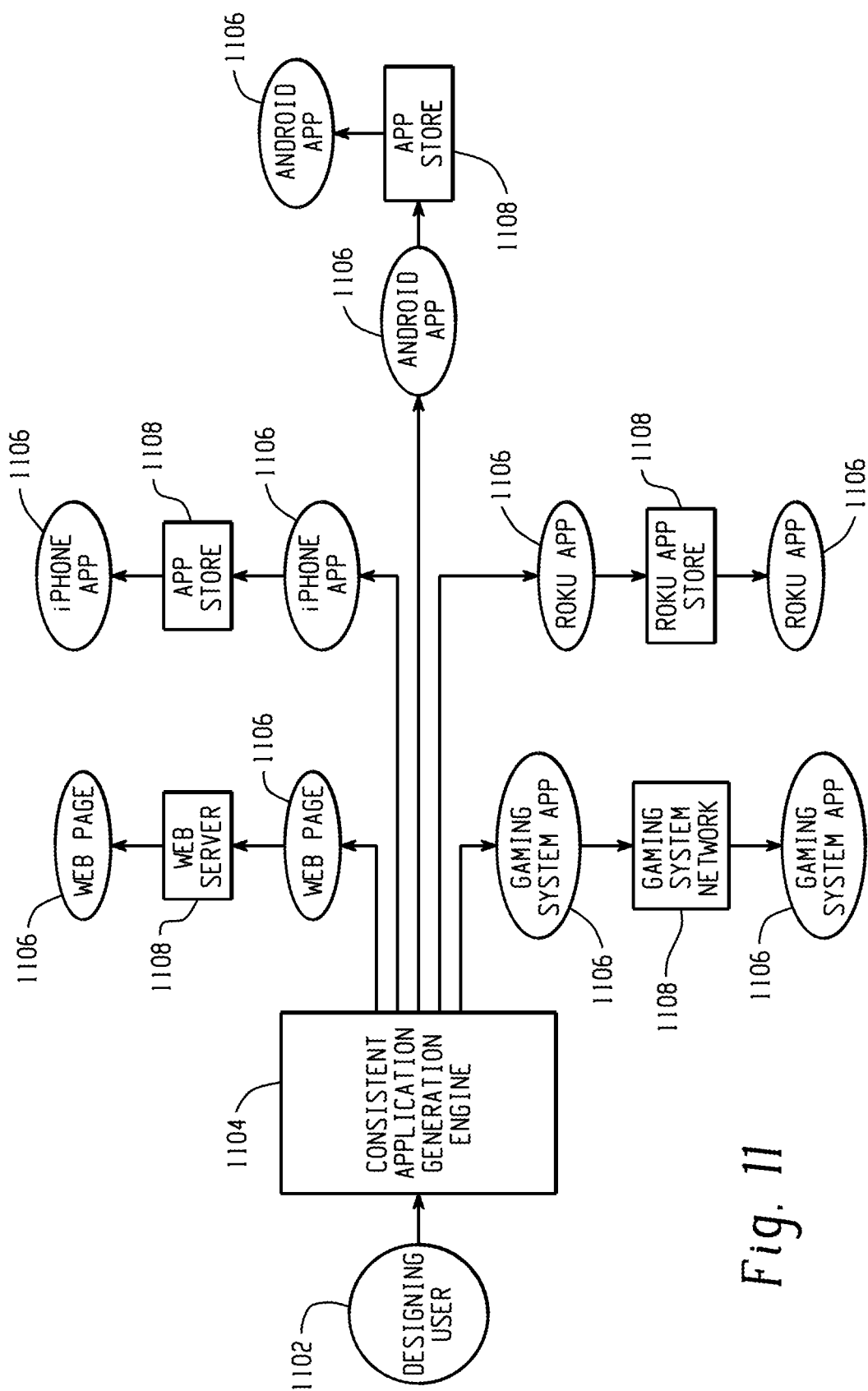
FIG. 11 is a block diagram depicting an automated transmission of generated applications to their respective repositories.

FIG. 11 is a block diagram depicting an automated transmission of generated applications to their respective repositories. A designing user 1102 interacts with a consistent application generation engine 1104 to generate a plurality of applications 1106 of disparate type. Following generation, the consistent application generation engine 1104 uploads the generated applications 1106 to their appropriate repositories 1108 automatically, without user intervention. Once uploaded, the applications 1106 are available for access and/or download by users. The automated uploading 1104 may be provided by a variety of mechanisms, which may be dictated in part by the particular platforms. For example, a web server repository may have a generated webpage uploaded via an FTP protocol, where the FTP user name and password of the web server are provided to the consistent application generation engine 1104 by the designing user 1102. In another example, an iPHONE application may be uploaded by the consistent application generation engine 1104 by the engine 1104 logging into the company's iTUNES account using appropriate credentials and uploading the generated application.

In addition to providing consistent applications across a plurality of platforms, a consistent application generation engine can be used as part of a white label solution for a service provider. A service provider may provide backend services, while enabling other companies to market and utilize those backend services under the other companies brand images. For example, a service provider may provide media access backend services, where content providers can upload content for access by users (e.g., for a fee). The service provider may provide services such as storage space for content, distribution mechanisms for content (e.g., download servers), and payment processing services.

A content provider may contract with the service provider to utilize the backend services, while using the content provider's brand image, such that, to the user, it appears that the interactive user experience is being provided by the content provider (i.e., the user is unable to discern the role of the service provider). In this arrangement, the content provider is able to utilize the backend services without detailed knowledge of the function and operation of those services (e.g., using a backend services API), and the service provider can concentrate on its technical area of expertise in providing the backend services without need for marketing and other advertising efforts.

Figure 12:
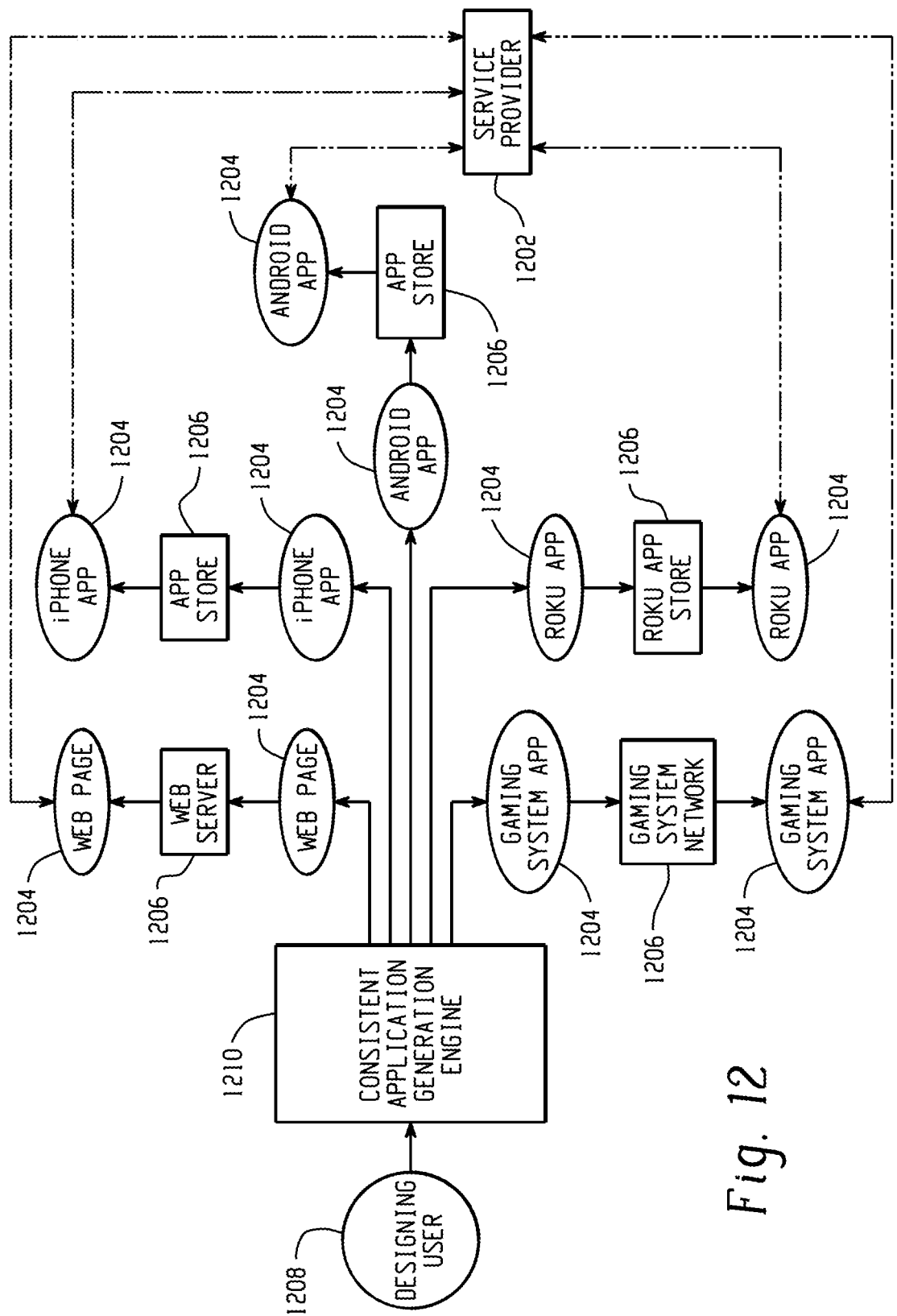
FIG. 12 is a block diagram depicting a consistent application generation engine working in concert with a service provider in providing a white label solution.

FIG. 12 is a block diagram depicting a consistent application generation engine working in concert with a service provider in providing a white label solution. A service provider 1202 provides back end services for a company to utilize using the company's brand image. The backend services provided by the service provider 1202 interact with the different platform applications 1204 made available by the company providing the brand image via platform application repositories 1206. For example, in the example where a content provider provides content for user download, the content provider uploads the user content to the service provider, and the service provider transmits listing of content available to the different platform applications 1204. The platform applications 1204 display the available content provided by the content provider, and the platform applications 1204 make that content available from the service provider upon user demand. In this way, a user can access the content provider's content using a number of different platforms (e.g., a web platform, an iPHONE platform, an Android platform, a gaming system platform, a ROKU platform).

When a designing user 1208 associated with the content provider desires to make changes to application 1204 layouts, the designing user 1208 accesses a consistent application generation engine 1210. The consistent application generation engine 1210 may be provided by the service provider 1202, such as via a portal where content providers can interact with the service provider 1202 to view and modify settings related to their applications 1204 and backend services. The designing user 1208 creates/edits an interactive user experience, such as by editing a template (e.g., a template provided by the service provider) or by programming an application for one of the platforms. The consistent application generation engine 1210 translates the designing user edits to generate the plurality of applications 1204 of disparate type and transmits those applications 1204 to the appropriate application repositories 1206. The consistent application generation engine 1210 may automatically include instructions for interacting with the backend services of the service provider into the generated applications 1204. This automatic inclusion of backend service instructions and incorporation with the design edits of the designing user 1208 may alleviate the designing user 1208 from needing an in depth understanding of the functionality of the service provider backend functions. By providing edits that appropriately interact with the backend services' programming interface, working applications are generated by the consistent application generation engine 1210 for the plurality of desired platforms.

Figure 13:
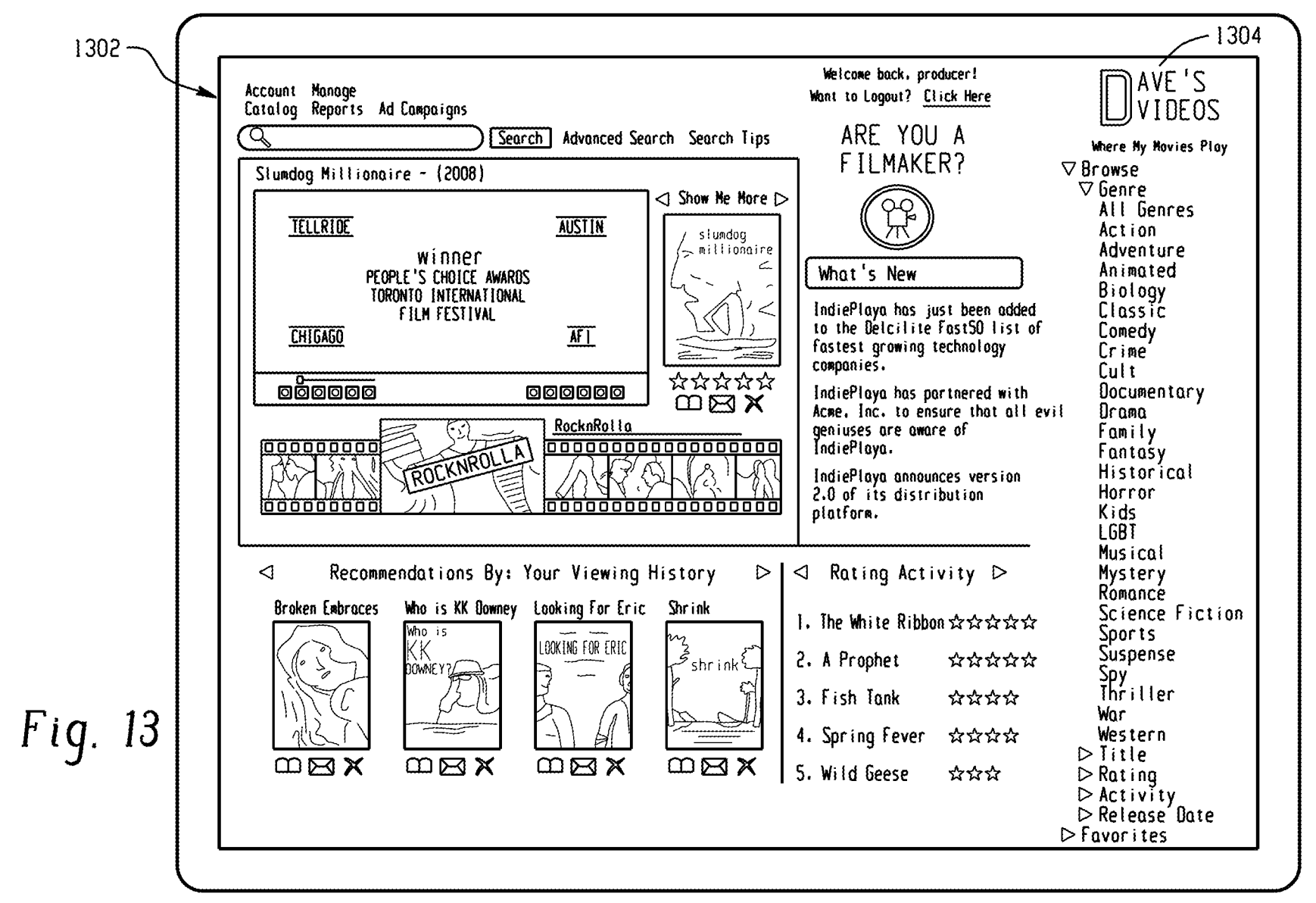

FIG. 13 depicts an iPAD platform application utilizing a white label solution of a service provider. The service provider (e.g., IndiePlaya) provides backend services related to the storing, distribution, and payment managing of content, where a content provider provides the content for user consumption. In the example of FIG. 13, a content provider, acting under the brand "Dave's Videos" provides streaming video for download by users for a fee. The iPAD platform application 1302 provides the content access functionality to users who download the application using the IndiePlaya backend functionality. However, the user is unaware of the role that IndiePlaya plays in providing such functionality, seeing only references to Dave's Video, as illustrated by the Dave's Video brand logo at 1304.

This specification describes the invention in terms of examples. It should be understood that an interactive user experience, as described herein, can include a wide range of experiences including dynamic applications that accept user input and respond accordingly, static webpages, and others.

Figure 14A:
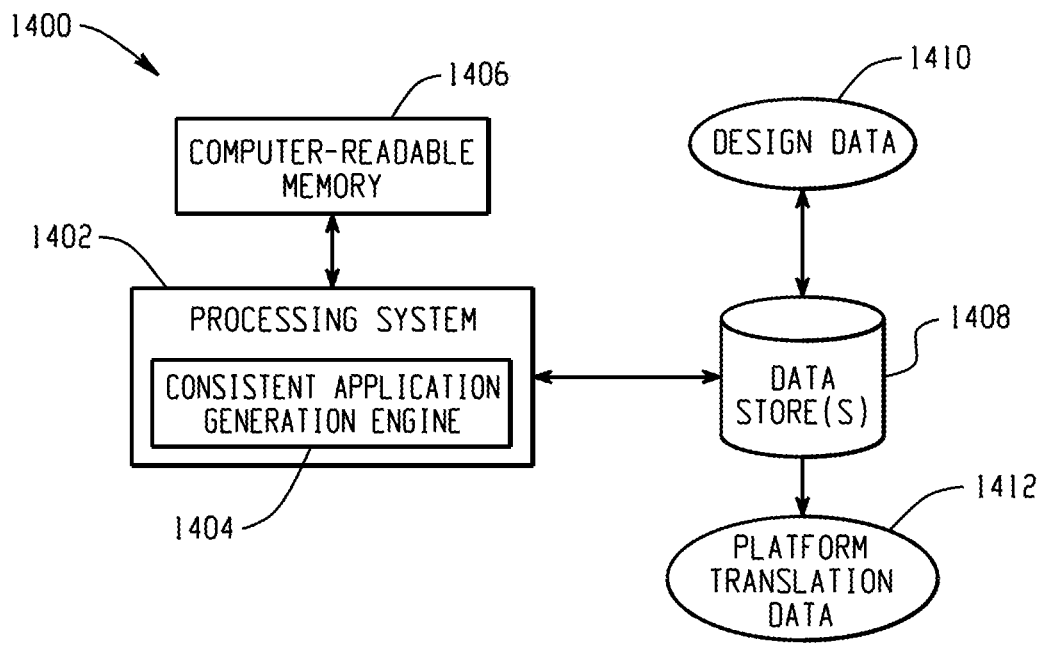
FIGS. 14A, 14B, and 14C depict example systems for use in implementing a consistent application generation engine.
Figure 14B:
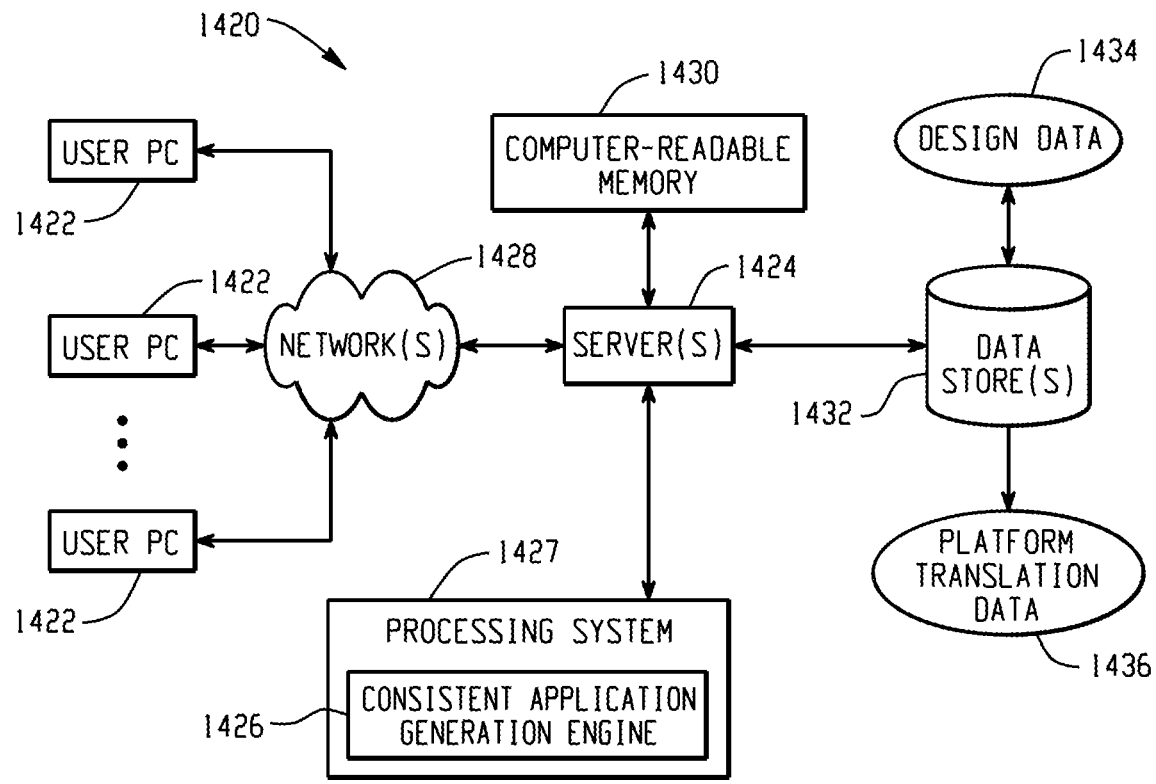
Figure 14C:
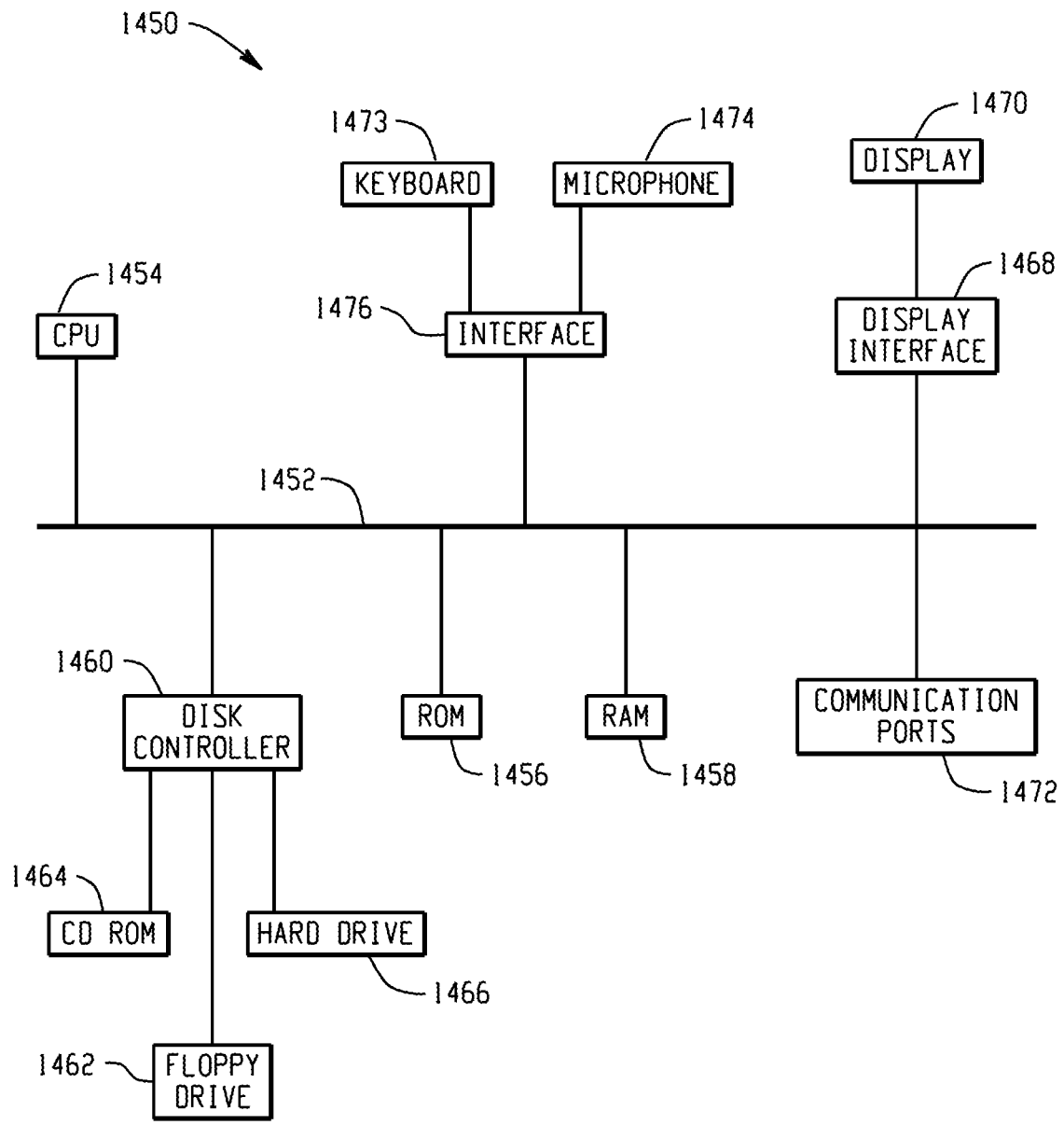

FIGS. 14A, 14B, and 14C depict example systems for use in implementing a consistent application generation engine. For example, FIG. 14A depicts an exemplary system 1400 that includes a standalone computer architecture where a processing system 1402 (e.g., one or more computer processors located in a given computer or in multiple computers that may be separate and distinct from one another) includes a consistent application generation engine 1404 being executed on it. The processing system 1402 has access to a computer-readable memory 1406 in addition to one or more data stores 1408. The one or more data stores 1408 may include design data 1410 as well as platform translation data 1412.

FIG. 14B depicts a system 1420 that includes a client server architecture. One or more user PCs 1422 access one or more servers 1424 running a consistent application generation engine 1426 on a processing system 1427 via one or more networks 1428. The one or more servers 1424 may access a computer readable memory 1430 as well as one or more data stores 1432. The one or more data stores 1432 may contain design data 1434 as well as platform translation data 1436.

FIG. 14C shows a block diagram of exemplary hardware for a standalone computer architecture 1450, such as the architecture depicted in FIG. 14A that may be used to contain and/or implement the program instructions of system embodiments of the present invention. A bus 1452 may serve as the information highway interconnecting the other illustrated components of the hardware. A processing system 1454 labeled CPU (central processing unit) (e.g., one or more computer processors at a given computer or at multiple computers), may perform calculations and logic operations required to execute a program. A processor-readable storage medium, such as read only memory (ROM) 1456 and random access memory (RAM) 1458, may be in communication with the processing system 1454 and may contain one or more programming instructions for performing the method of implementing a consistent application generation engine. Optionally, program instructions may be stored on a non-transitory computer readable storage medium such as a magnetic disk, optical disk, recordable memory device, flash memory, or other physical storage medium.

A disk controller 1460 interfaces one or more optional disk drives to the system bus 1452. These disk drives may be external or internal floppy disk drives such as 1462, external or internal CD-ROM, CD-R, CD-RW or DVD drives such as 1464, or external or internal hard drives 1466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1460, the ROM 1456 and/or the RAM 1458. Preferably, the processor 1454 may access each component as required.

A display interface 1468 may permit information from the bus 1452 to be displayed on a display 1470 in audio, graphic, or alphanumeric format. Communication with external devices may optionally occur using various communication ports 1472.

In addition to the standard computer-type components, the hardware may also include data input devices, such as a keyboard 1473, or other input device 1474, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method for generating a plurality of applications of disparate types, comprising:
   receiving an identification of a user experience;
   receiving an identification of a plurality of disparate types of applications to be generated; and
   translating the user experience for each of the disparate types of applications to generate the plurality of applications of disparate types.

2. The method of claim 1, wherein the plurality of applications are transmitted to a designing user.

3. The method of claim 1, wherein the plurality of applications are automatically transmitted to application repositories for access by users.

4. The method of claim 3, wherein the application repositories include an application store.

5. The method of claim 4, wherein the application store is associated with a programming platform, wherein one of the generated applications associated with the programming platform is transmitted to the application store.

6. The method of claim 5, wherein a user device is associated with the programming platform, wherein the one of the generated applications is downloaded from the application store using the user device.

7. The method of claim 5, wherein the application store is an Apple app store, an Android app store, a ROKU app store, or a gaming system network app store.

8. The method of claim 1, wherein the user experience provides access to audio, visual, or literary data for download via the plurality of applications for consumption on a plurality of different application platforms and hardware platforms.

9. The method of claim 1, wherein the user experience is received via a graphical user interface that provides controls for editing a webpage version of the designed user experience, wherein the translating converts the webpage version of the designed user experience for each of the disparate types of application to generate the plurality of applications of disparate type.

10. The method of claim 1, wherein a graphical user interface provides controls for editing a template version of the user experience, wherein the translating converts the template version of the user experience for each of the disparate types of application to generate the plurality of applications of disparate type.

11. The method of claim 1, wherein the user experience comprise interface elements having attributes that include type, position, size, color, or function.

12. The method of claim 1, wherein one of the plurality of applications is a webpage.

13. The method of claim 1, wherein the plurality of applications includes one or more of: a webpage, an Apple app, an Android app, a ROKU app, and a gaming system network app.

14. The method of claim 1, wherein a graphical user interface provides a template for the user experience, wherein an identification of the interface elements received make edits to the template.

15. The method of claim 1, wherein the translating provides a consistent brand image across the plurality of applications of disparate type, where the user experience is designed by a designing user for no more than one platform associated with the plurality of applications of disparate type.

16. The method of claim 1, further comprising:
loading a previously designed user experience;
receiving edits to the previously designed user experience, wherein the edits include changes to interface elements;
translating the edited user experience to the plurality of applications of disparate types to generate new versions of the plurality of applications.

17. The method of claim 16, wherein the edits change the appearance of the user experience, wherein the translating the user experience propagates the changes in the appearance to the plurality of applications of disparate type.

18. A computer-implemented system for generating a plurality of applications of disparate types, comprising:
one or more data processors;
a non-transitory computer-readable medium encoded with instructions for commanding the one or more data processors to execute steps including:
receiving an identification of a user experience;
receiving an identification of a plurality of disparate types of applications to be generated; and
translating the user experience for each of the disparate types of applications to generate the plurality of applications of disparate types.

19. A non-transitory computer-readable medium encoded with instructions for commanding one or more data processors to execute steps for generating a plurality of applications of disparate types, the steps comprising:
receiving an identification of a user experience;
receiving an identification of a plurality of disparate types of applications to be generated; and
translating the user experience for each of the disparate types of applications to generate the plurality of applications of disparate types.

20. A system as in claim 18, wherein the user experience is received via a graphical user interface that provides controls for editing a webpage version of the designed user experience, wherein the translating converts the webpage version of the designed user experience for each of the disparate types of application to generate the plurality of applications of disparate type.

* * * * *